(12) United States Patent
Wyant (10) Patent No.: US 9,238,924 B2
(45) Date of Patent: Jan. 19, 2016

(54) COLLAPSIBLE FABRIC STRUCTURE SUPPORTED BY HUBS AND RODS

(71) Applicant: Richard A. Wyant, Red Hook, NY (US)

(72) Inventor: Richard A. Wyant, Red Hook, NY (US)

( * ) Notice: Subject to any disclaimer, the term of this patent is extended or adjusted under 35 U.S.C. 154(b) by 0 days.

(21) Appl. No.: 14/636,225

(22) Filed: Mar. 3, 2015

(65) Prior Publication Data

US 2015/0250162 A1 Sep. 10, 2015

Related U.S. Application Data

(60) Provisional application No. 61/950,143, filed on Mar. 9, 2014.

(51) Int. Cl.
| | |
|---|---|
| *E04H 15/00* | (2006.01) |
| *E04H 15/44* | (2006.01) |
| *A01M 31/00* | (2006.01) |
| *A01M 31/02* | (2006.01) |
| *E04H 15/48* | (2006.01) |
| *E04H 15/34* | (2006.01) |
| *E04H 15/54* | (2006.01) |

(52) U.S. Cl.
CPC ........... *E04H 15/001* (2013.01); *A01M 31/025* (2013.01); *E04H 15/44* (2013.01); *E04H 15/48* (2013.01); *A01M 31/02* (2013.01); *E04H 15/34* (2013.01); *E04H 15/54* (2013.01)

(58) Field of Classification Search
CPC ....... E04H 15/44; E04H 15/48; E04H 15/001; A01M 31/025
USPC ......................................................... 135/147
See application file for complete search history.

(56) References Cited

U.S. PATENT DOCUMENTS

| | | | | |
|---|---|---|---|---|
| 2,113,118 A * | 4/1938 | Pyatt | ...................... | E04H 15/28 |
| | | | | 135/123 |
| 3,810,482 A * | 5/1974 | Beavers | .................. | E04H 15/48 |
| | | | | 135/147 |
| 4,280,521 A * | 7/1981 | Zeigler | ...................... | 135/120.3 |
| 5,628,338 A * | 5/1997 | Stumbo | ........................ | 135/147 |
| 6,892,744 B2 * | 5/2005 | Feldpausch | ........... | E04H 15/001 |
| | | | | 135/114 |
| 7,320,332 B2 * | 1/2008 | Reis | ........................ | E04H 15/44 |
| | | | | 135/115 |
| 7,565,909 B2 * | 7/2009 | Reis | ...................... | E04H 15/001 |
| | | | | 135/115 |
| 7,614,415 B1 * | 11/2009 | Wehner | .................... | A01G 9/16 |
| | | | | 135/126 |
| 7,802,582 B2 | 9/2010 | Livacich et al. | | |
| 7,828,003 B2 | 11/2010 | Montecucco | | |
| 7,958,904 B2 * | 6/2011 | Lau | .................... | A01M 31/025 |
| | | | | 135/147 |
| 8,066,022 B2 | 11/2011 | Schlipf | | |
| 8,881,753 B2 | 11/2014 | Rowley | | |
| 2005/0178420 A1 * | 8/2005 | Reis | ............................. | 135/133 |
| 2008/0083443 A1 * | 4/2008 | Eastman, II | ............. | E04H 15/44 |
| | | | | 135/121 |

* cited by examiner

*Primary Examiner* — Noah Chandler Hawk
(74) *Attorney, Agent, or Firm* — Law Offices of Michael L. Wise, LLC (57) ABSTRACT

A structure including a first end panel, a second end panel, and a side panel that spans between the first end panel and the second end panel. The various panels are supported by a plurality of hubs and rods. When erected, the structure appears similar in shape to a hay bale. The structure may be manually collapsed into a very compact form for transport and storage.

17 Claims, 6 Drawing Sheets

COLLAPSIBLE FABRIC STRUCTURE SUPPORTED BY HUBS AND RODS

FIELD OF THE INVENTION

The present invention relates generally to fabric structures, and, more particularly, to fabric structures suitable as hunting blinds and the like.

BACKGROUND OF THE INVENTION

Fabric structures are regularly used while hunting to provide camouflage. Nevertheless, many such fabric structure designs do not blend into their surroundings in a natural manner, and/or are burdensome to transport, set-up, and take down. For this reason, there is a need for fabric structure designs that address these various shortcomings.

SUMMARY OF THE INVENTION

Embodiments of the present invention address the above-identified needs by providing fabric structures suitable for use as hunting blinds and the like. Advantageously, these fabric structures are easily transported, set-up, and taken down.

Aspects of the invention are directed to a structure comprising a first end panel, a plurality of first pockets disposed on the first end panel, a first hub, and a plurality of first rods emanating from the first hub with each of the plurality of first rods terminating in a respective one of the plurality of first pockets. The structure further comprises a second end panel, a plurality of second pockets disposed on the second end panel, a second hub, and a plurality of second rods emanating from the second hub with each of the plurality of second rods terminating in a respective one of the plurality of second pockets. Lastly, the structure even further comprises a side panel spanning between the first end panel and the second end panel, a plurality of side pockets disposed on the side panel, a plurality of side hubs, and a plurality of side rods, four respective side rods of the plurality of side rods emanating from each of the plurality of side hubs with each of the plurality of side rods terminating in a respective one of the plurality of side pockets.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

The word "adjacent" as used herein and in the appended claims is intended to mean within three inches. The term "substantially parallel" means parallel within ten degrees. The term "about" means within 15%. Finally, something may be performed "manually" if it may be performed by a human being of average strength using only his hands without breaking or damaging the object being worked upon.

Figure 1:
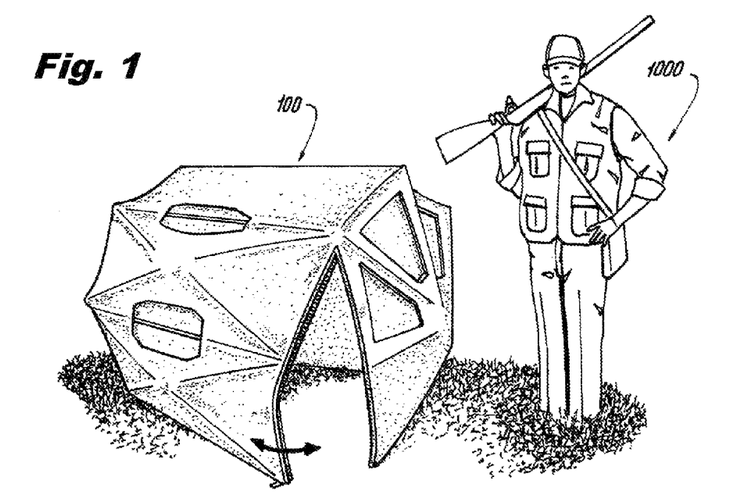
FIG. 1 shows a perspective view of a structure in accordance with an illustrative embodiment of the invention in addition to a hunter.
Figure 2:
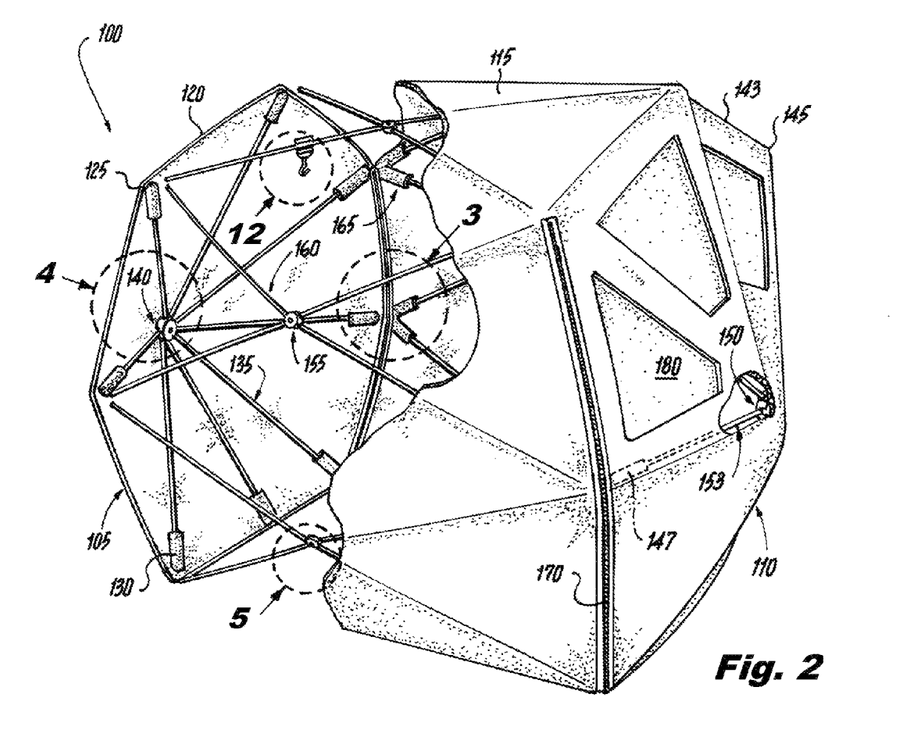
FIG. 2 shows a partially broken perspective view of the FIG. 1 structure.
Figures 3, 4, 5, 6:
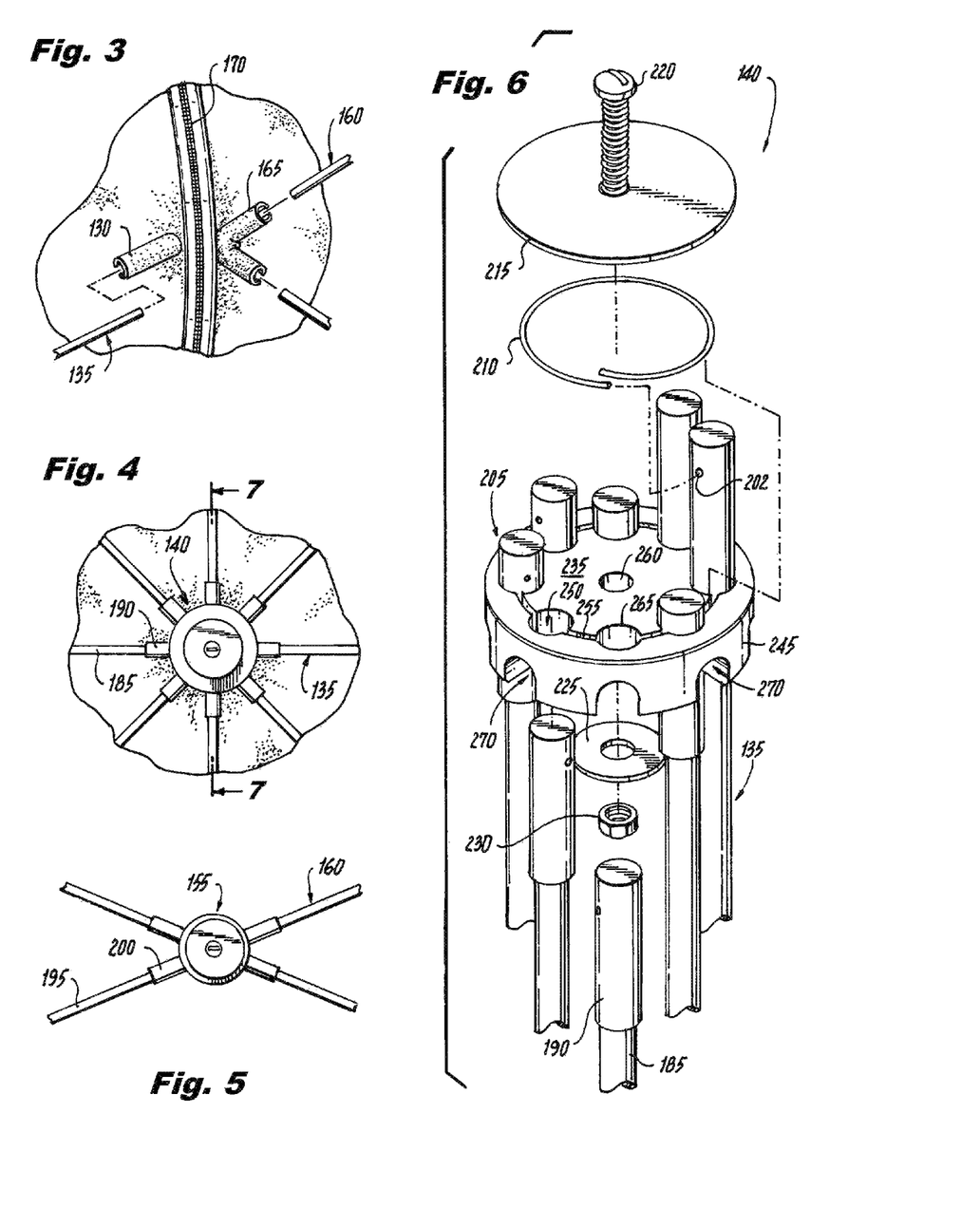
FIGS. 3-5 show magnified perspective views of the portions of the FIG. 1 structure indicated in FIG. 2.
FIG. 6 shows an exploded perspective view of a hub in the FIG. 1 structure.

FIGS. 1-5 show aspects of a structure 100 in accordance with an illustrative embodiment of the invention. FIG. 1 shows a perspective view of the structure 100 along with a hunter 1000; FIG. 2 shows a partially broken perspective view of the structure 100; and FIGS. 3-5 show magnified perspective views of the portions of the structure 100 indicated in FIG. 2. In the present embodiment, the structure 100 may be used as a hunting blind. That is, the hunter 1000 may occupy the structure 100 while not being readily visible to game. Nevertheless, this particular use is not intended to be limiting.

The structure 100 comprises a first end panel 105, a second end panel 110, and a side panel 115. The side panel 115 spans between the first end panel 105 and the second end panel 110 to form the integrated structure 100. When erected as shown in FIGS. 1 and 2, the three panels 105, 110, 115 are supported by various hubs and rods. The first end panel 105 defines seven first straight edges 120 along its perimeter that are separated by seven first corners 125 to form what might be called a truncated octagonal shape. One of the seven first straight edges 120 is longer than the others so that the structure 100 may sit flatly on the ground. Eight first pockets 130 are disposed on the first end panel 105, with seven of the first pockets 130 positioned adjacent to the seven first corners 125, and the remaining eighth first pocket 130 disposed adjacent to a center of the longer first straight edge 120. Eight first rods 135 emanate from a first hub 140, which is located near the center of the first end panel 105. Each of the eight first rods 135 terminates in a respective one of the first pockets 130.

The second end panel 110 is arranged and supported in a manner similar to the first end panel 105. The second end panel 110 is also seven-sided along its perimeter with seven second straight edges 143 separated by seven second corners 145, and includes eight second pockets 147, a second hub 150, and eight second rods 153. When erected, the second end panel 110, the second pockets 147, the second hub 150, and the second rods 153 form a mirror image of the first end panel 105, the first pockets 130, the first hub 140, and the first rods 135.

The side panel 115 is supported by six side hubs 155. Four respective side rods 160 emanate from each side hub 155 so that 24 side rods 160 are implemented in total. The side rods 160 terminate in 24 side pockets 165 with each side pocket 165 disposed adjacent to either a first corner 125 of the first end panel 105 or a second corner 145 of the second end panel 110. The side panel 115 does not span between the first and second end panels 105, 110 directly on the ground; the structure 100 is open on its bottom.

In the present embodiment, four zippers 170 are disposed between portions of the end panels 105, 110 and portions of the side panel 115 to allow easy ingress and egress from the structure 100. Opening the two zippers 170 on one side of the structure 100 allows a large portion of the side panel 115 to be hinged upward. This large opening may allow a person in a wheelchair to enter the structure 100.

Windows 180 are positioned about the structure 100 to allow a hunter to observe and fire at game. In the present embodiment, the windows 180 comprise flaps that are attached to the remainder of the structure 100 along one respective edge and that are held closed by strips of hook-and-loop fastener material. Alternatively, the windows 180 may be held closed by snaps, zippers, buttons, and other means of temporary fastening.

Reference to FIGS. 4 and 5 indicates that each of the first rods 135, the second rods 153, and the side rods 160 comprise two portions: a respective main rod portion and a respective end rod portion. FIG. 4 shows the first rods 135 with their first main rod portions 185 and their first end rod portions 190, while FIG. 5 shows representative side rods 160 with their side main rod portions 195 and their side end rod portions 200. In the present embodiment, each end rod portion 190, 200 is partially hollow cylindrical in shape and encircles a portion of its respective main rod portion 185, 195, which is solid cylindrical. Accordingly, as used herein, the term "rod" may designate an elongate element with more than one part. Attachment between the two parts of each rod 135, 153, 160 may be via, as just a few non-limiting examples, crimping, an adhesive, a set screw, or a bolt that passes through both elements and terminates in a nut. In even other embodiments, the rods 135, 153, 160 may be manufactured as unitary elements.

Reference to FIGS. 4 and 5, moreover, show that, while the first rods 135 emanate from the first hub 140 with even spacing like spokes on a wheel, the side rods 160 emanate from their respective side hubs 155 with uneven spacing. In the representative side hub 155 shown in FIG. 5, there are two opposed pairs of side rods 160 with each pair comprising two side rods 160 that differ in orientation by about 30 degrees. This allows the side rods 160 for a given side hub 155 to support the side panel 115 at corners of a rectangle rather than at corners of a square.

Figure 7:
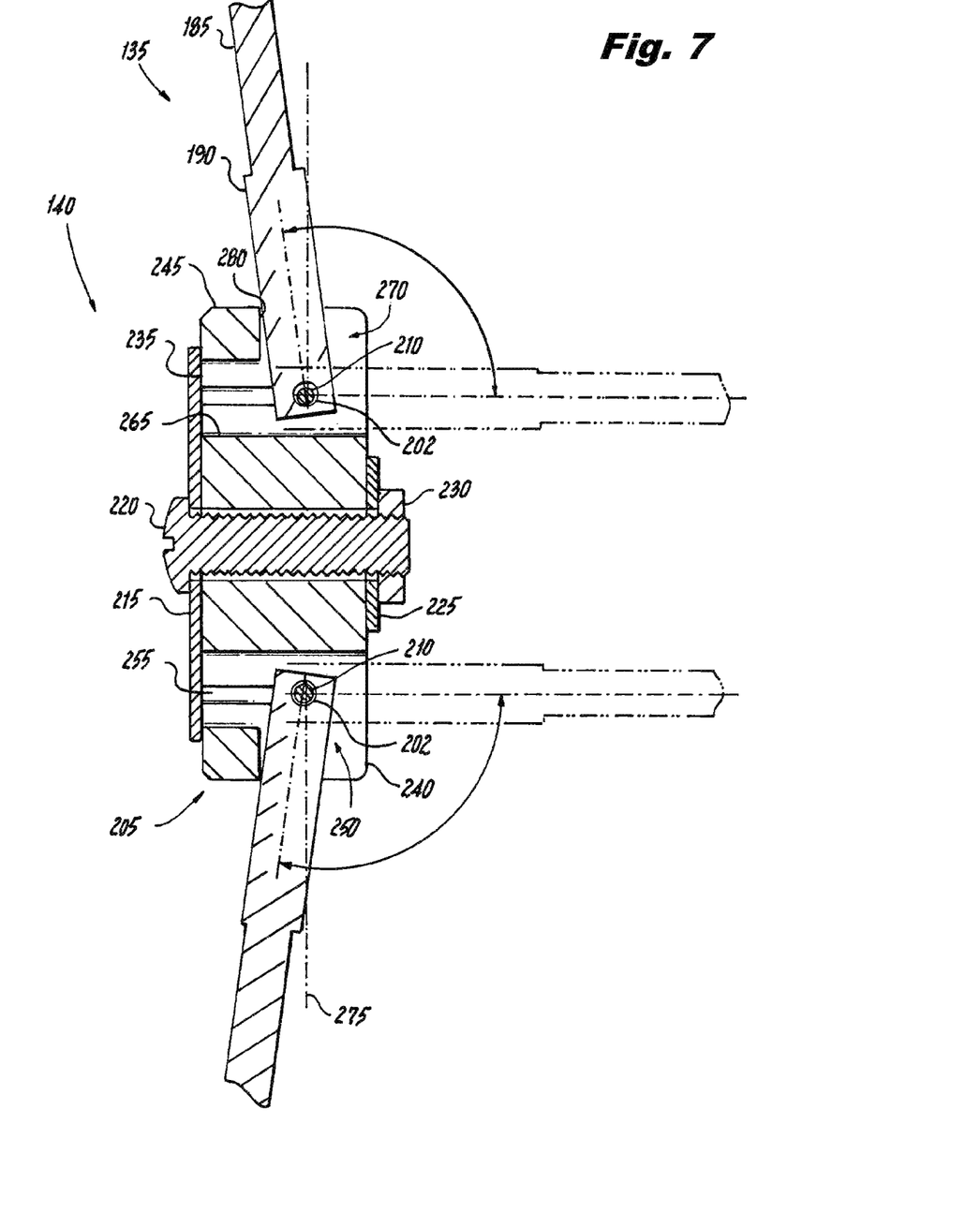
FIG. 7 shows a sectional view of the FIG. 6 hub.
Figure 8:
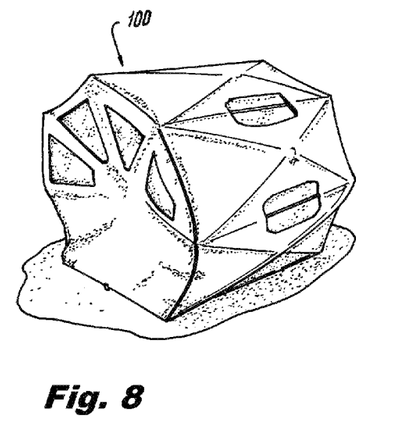
FIGS. 8-11 show perspective views of the FIG. 1 structure in various stages while being collapsed.
Figure 9:
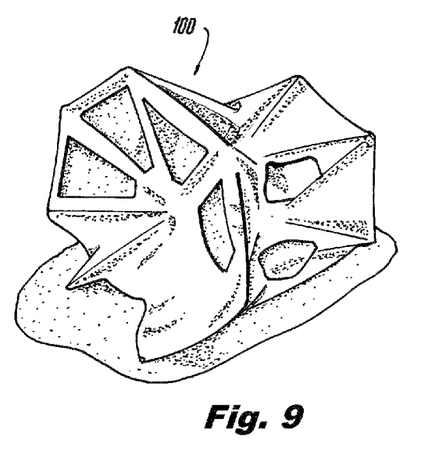
Figure 10:
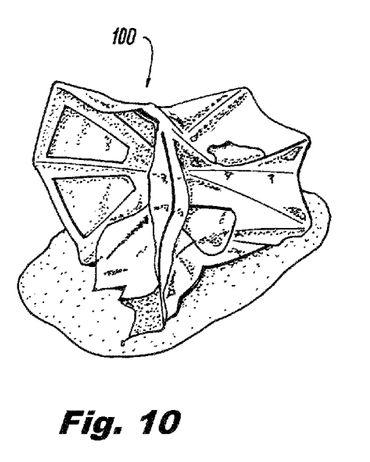

Additional aspects of the first hub 140 and the first rods 135 are shown in an exploded perspective view in FIG. 6 and a sectional view in FIG. 7. While only the first hub 140 is detailed, it is contemplated that the second hub 150, the second rods 153, the side hubs 155, and the side rods 160 would be arranged and function in a similar manner. The first hub 140 comprises a hub disk 205, a wire 210, a cover plate 215, a bolt 220, a washer 225, and a nut 230. The hub disk 205 defines a front face 235, a rear face 240, a circular edge 245, eight cavities 250, a circular slot 255, and a central opening 260. Each of the eight cavities 250 is itself defined by a combination of a respective aperture 265, and a respective channel 270 in the rear face 240 of the first hub 140. The apertures 265 are arranged radially about the central opening 260, and each aperture 265 passes completely through the hub disk 205. Each channel 270, in contrast, only passes about two-thirds of the way from the rear face 240 to the front face 235 of the hub disk 205, and is arranged so that it spans between a respective one of the apertures 265 and the circular edge 245 of the hub disk 205. Accordingly, each of the cavities 250, being a combination of a respective aperture 265 and a respective channel 270, effectively intersects both faces 235, 240 of the hub disk 205, as well as the circular edge 245 of the hub disk 205. The circular slot 255 in the front face 235 of the hub disk 205 passes about one-half of the way from the front face 235 to the rear face 240, and intersects all eight of the apertures 265 approximately at their centers.

When assembled, the cavities 250 are occupied by the first end rod portions 190 of the first rods 135. At the same time, the wire 210 is disposed in the circular slot 255, where it passes through transverse holes 202 in the first rods 135. The cover plate 215 traps the wire 210 within the circular slot 255. The bolt 220 passes through the cover plate 215, the central opening 260 of the hub disk 205, the washer 225, and is finally captured by the nut 230.

Arranged in this manner, the first rods 135 can each be rotated in the first hub 140 between folded positions (FIG. 6; dashed lines in FIG. 7) and expanded positions (FIGS. 1, 2, and 4; and solid lines in FIG. 7). Because of the geometries of the circular slot 255 and the cavities 250 inside the hub disk 205, each of the first rods 135 can be rotated past a plane 275 that is parallel with the front and rear faces 235, 240 of the hub disk 205. After being rotated past the plane 275, however, significant additional rotation of the first rods 135 is limited by an interference between the first rods 135 and the hub disk 205 at surfaces 280, shown in FIG. 7. In the present embodiment, rotation of the first rods 135 in the hub disk 205 is limited to about 100 degrees, but this particular value is merely illustrative.

Advantageously, this functionality gives the first rods 135 of the first hub 140 the ability to "lock" or "toggle" into their expanded positions when used with a tightly fitted first end panel 105 (i.e., a first end panel 105 that places a substantial compressive force on the first rods 135 when being expanded thereby). More precisely, when acting to stretch a tightly-fitted fabric first end panel 105, the compressive forces acting on the first rods 135 in response to stretching the fabric first end panel 105 are at a maximum when the first rods 135 are in the plane 275, and are somewhat relieved when they rotate past the plane 275 (i.e. when the first rods 135 achieve what may be called an "over-center" condition). A potential barrier to moving the first rods 135 back through the plane 275 in the opposite direction (i.e., towards the folded position) is thereby created. This allows the first hub 140 assembly to be "popped" into and out of its expanded state when setting up the structure 100. Once expanded, the first hub 140 assembly tends to stay expanded. The second hub 150 and the side hubs 155 would behave in a similar manner with a sufficiently taut second end panel 110 and side panel 115.

Figure 11:
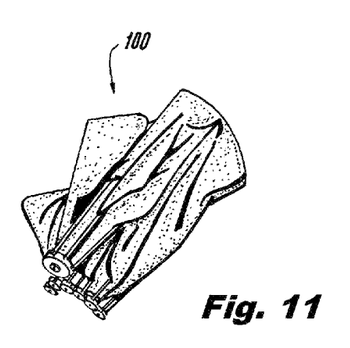

The structure 100 may be manually collapsed (i.e., folded up) into a compact form to aid in transport and storage. FIGS. 8-11 show perspective views of the structure 100 in various stages while being collapsed. Collapsing the structure 100 is effectuated by rotating the rods 135, 153, 160 on the various hubs 140, 150, 155 into their folded positions. The ultimate collapsed state is shown in FIG. 11. In the collapsed state, the first rods 135, the second rods 153, and the side rods 160 may be made to run substantially parallel to each other. At the same time, in the collapsed state, the hubs 140, 150, 155 may be collected together so that they abut one another. That is, the first hub 140 may be made to abut the second hub 150 or one of the side hubs 155. To collapse the structure 100, no rods 135, 153, 160 need to be removed from their respective pockets 130, 147, 165, nor do any zippers 170 need to be unzipped.

This kind of folding is aided in the structure 100 by imparting elements of the structure 100 with certain common dimensions. Reference again to FIG. 2 will indicate, for example, that the first hub 140, has seven first rods 135 that terminate in first pockets 130 disposed adjacent to first corners 125 of the first end panel 105. The distance from the center of the first hub 140 to the end of one of these seven first rods 135 is approximately equal to the distance from the center of one of the side hubs 155 to the end of one of the side rods 160 emanating from that side hub 155. "Approximately," as used in this context, is intended to mean within 15%. The second hub 150 and its second rods 153, being the mirror image of the first hub 140 and its first rods 135, are similarly dimensioned. Designed in this fashion, the structure 100 may take on the very compact shape indicated in FIG. 11. When actually reducing the structure 100 to practice, straying from this design was discovered by the inventor to cause the structure 100 to bind up before achieving the compact form of FIG. 11. Thus the above-identified design constraints are preferred.

The panels 105, 110, 115 and the pockets 130, 147, 165 of the structure 100 are preferably formed of one or more types of fabric (e.g., canvas, nylon, polyester). The panels 105, 110, 115 preferably exhibit a camouflage pattern suitable to the environment in which the hunting is to occur. The structure 100, for example, is shaped in the manner of a hay bale, and, as a result, a camouflage pattern that appears like hay may be particularly effective. The various components of the hubs 140, 150, 155 and the rods 135, 153, 160 can comprise metal, plastic, wood, as well as any other suitable materials. Once understood from the teachings herein, the various components forming the hubs 140, 150, 155 and the rods 135, 153, 160 can be fabricated utilizing conventional fabrication techniques and/or sourced from commercial vendors.

Figure 12:
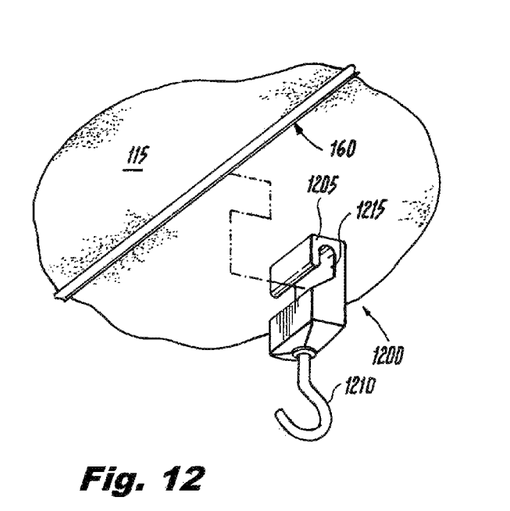
FIG. 12 shows a perspective view of a hook in accordance with a first illustrative embodiment of the invention for use with the FIG. 1 structure.

Various accessories may be used with the structure 100 to make the structure 100 even more convenient for hunting and other activities. FIG. 12, for example, shows a perspective view of a first hook 1200 in accordance with a first illustrative embodiment of the invention in combination with the side panel 115 and one of the side rods 160. The first hook 1200 comprises a first base portion 1205 that is attached to a j-shaped first hook portion 1210. The first hook 1200 is attached to the structure 100 by inserting the side rod 160 into a first slot 1215 in the first base portion 1205. So placed, the side panel 115 presses the first base portion 1205 against the side rod 160 so as to fixate the first hook 1200 in place. The first hook 1200 thereby becomes a convenient means for supporting an archery bow or other equipment while utilizing the structure 100. The first hook 1200 may just as easily be placed on a first rod 135 or a second rod 153.

Figure 13:
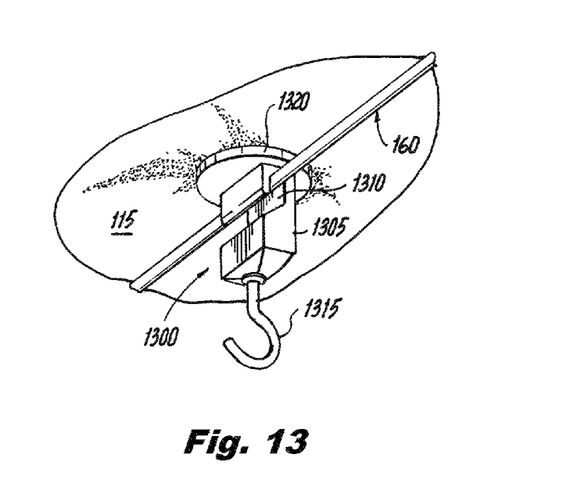
FIG. 13 shows a perspective view of a hook in accordance with a second illustrative embodiment of the invention for use with the FIG. 1 structure.

FIG. 13 shows a perspective view of a second hook 1300 in accordance with a second illustrative embodiment of the invention, also in combination with the side panel 115 and one of the side rods 160. In a manner similar to the first hook 1200, the second hook 1300 comprises a second body portion 1305 that defines a slot 1310, as well as a second hook portion 1315. However, unlike the first hook 1200, the second hook 1300 further comprises a second disk portion 1320 attached to the second base portion 1305. When mounted, the side panel 115 presses against the second disk portion 1320, distributing that pressure over a larger area than would be the case were the second disk portion 1320 absent. The second disk portion 1320, moreover, helps to assure that the second hook 1300 remains oriented normal to the side panel 115.

Figure 14:
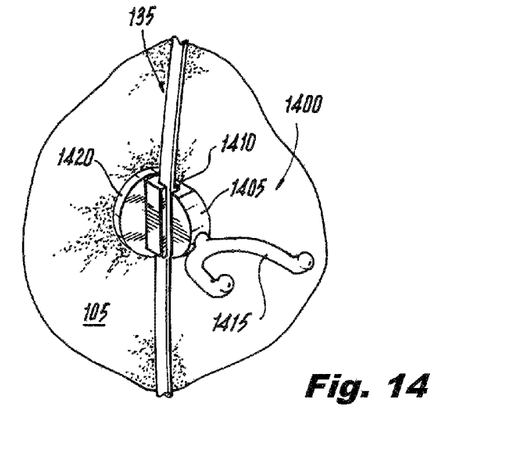
FIG. 14 shows a perspective view of a hook in accordance with a third illustrative embodiment of the invention for use with the FIG. 1 structure.

FIG. 14 shows a perspective view of a third hook 1400 in accordance with a third illustrative embodiment of the invention in combination with the first end panel 105 and one of the first rods 135. The third hook 1400 includes a third body portion 1405 with a third slot 1410, a third hook portion 1415, and a third disk portion 1420. The third hook 1400 is similar to the second hook 1300, but, in the third hook 1400, the third hook portion 1415 is u-shaped in a manner that is well suited to supporting a rifle or shotgun.

Figure 15:
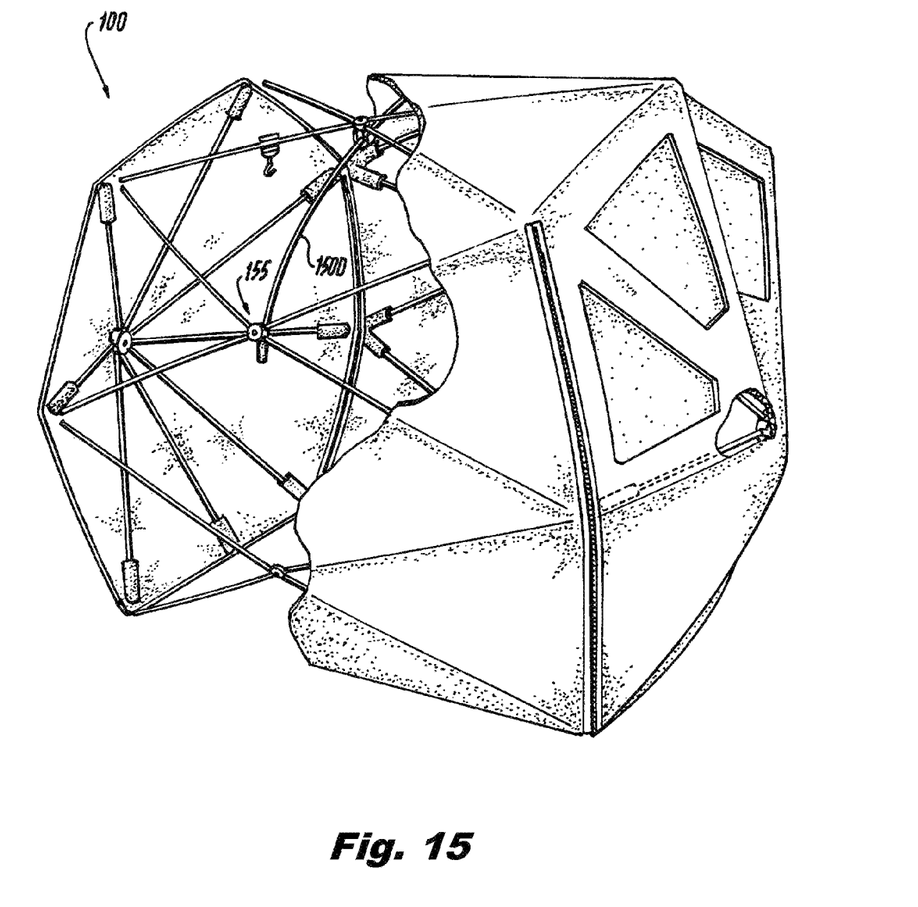
FIG. 15 shows a perspective view of the FIG. 1 structure with the addition of an optional support rod.

FIG. 15 shows a partially broken perspective view of the structure 100 with the addition of an optional support rod 1500. When fitted to the structure 100, the optional support rod 1500 spans across four side hubs 155 that support the roof of the structure 100. Pockets fixated to the side hubs 155 at the terminuses of the optional support rod 1500, and loops attached to the central pair of side hub 155 allow the optional support rod 1500 to be easily added and removed from the structure 100. When in place, the optional support rod 1500 provides even greater structural integrity to the structure 100. Such added support may be of particular benefit when snow is pressing down on the roof of the structure 100.

In closing, it should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

For example, structures in accordance with aspects of the invention may include end panels that have fewer or greater than seven straight edges and a correspondingly fewer or greater number of hubs, rods, and pockets. In general, the greater the number of straight edges incorporated into the end panels, the more rounded the structure appears, but at the cost of complexity and cost. Structures in accordance with aspects of the invention may also be fitted with external loops that provide a convenient means for tying down the structure utilizing tent stakes.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A structure comprising:
   a first end panel;
   a plurality of first pockets disposed on the first end panel;
   a first hub;
   a plurality of first rods emanating from the first hub with each of the plurality of first rods terminating in a respective one of the plurality of first pockets;
   a second end panel;
   a plurality of second pockets disposed on the second end panel;
   a second hub;
   a plurality of second rods emanating from the second hub with each of the plurality of second rods terminating in a respective one of the plurality of second pockets;
   a side panel spanning between the first end panel and the second end panel;
   a plurality of side pockets disposed on the side panel;
   a plurality of side hubs; and
   a plurality of side rods, four respective side rods of the plurality of side rods emanating from each of the plurality of side hubs with each of the plurality of side rods terminating in a respective one of the plurality of side pockets
   wherein a perimeter of the first end panel defines a plurality of straight edges separated by a plurality of corners,
   wherein the plurality of straight edges comprises a longer straight edge that is longer than the others,
   wherein one of the plurality of the first pockets is disposed adjacent to a center of the longer straight edge.

2. The structure of claim 1, further comprising a zipper disposed between a portion of the first end panel and a portion of the side panel.

3. The structure of claim 1, wherein each of the first end panel, the second end panel, and the side panel comprises a fabric.

4. The structure of claim 1, wherein a respective one of the plurality of first pockets is disposed adjacent to each corner of the plurality of corners.

5. The structure of claim 1, wherein the structure defines one or more windows.

6. The structure of claim 1, wherein the first hub defines a plurality of cavities, each of the plurality of cavities occupied by a respective one of the plurality of first rods.

7. The structure of claim 6, wherein:
the first hub defines two faces and a circular edge; and
each of the plurality of cavities intersects the two faces and the circular edge.

8. The structure of claim 1, wherein the first hub comprises a wire, the wire passing through the plurality of first rods.

9. The structure of claim 8, wherein:
the first hub defines a circular slot; and
the wire is disposed in the circular slot.

10. The structure of claim 1, wherein the plurality of first rods are operative to rotate inside the first hub by more than 90 degrees.

11. The structure of claim 1, wherein each of the first rods comprises:
a respective first main rod portion; and
a respective first end rod portion that encircles a portion of the respective main rod portion.

12. The structure of claim 1, wherein each of the side rods comprises:
a respective side main rod portion; and
a respective side end rod portion that encircles a portion of the respective side main rod portion.

13. The structure of claim 1, wherein the structure is manually collapsible into a condition wherein the plurality of first rods, the plurality of second rods, and the plurality of side rods run substantially parallel to each other.

14. The structure of claim 1, wherein the structure is manually collapsible into a condition wherein the first hub abuts the second hub or one of the plurality of side hubs.

15. A structure comprising:
a first end panel defining seven first straight edges separated by seven first corners along its perimeter;
eight first pockets disposed on the first end panel;
a first hub;
eight first rods emanating from the first hub with each of the eight first rods terminating in a respective one of the eight first pockets;
a second end panel defining seven second straight edges separated by seven second corners along its perimeter;
eight second pockets disposed on the second end panel;
a second hub;
eight second rods emanating from the second hub with each of the eight second rods terminating in a respective one of the eight second pockets;
a side panel spanning between the first end panel and the second end panel;
twenty-four side pockets disposed on the side panel;
six side hubs; and
twenty-four side rods, four respective side rods of the twenty-four side rods emanating from each of the six side hubs with each of the twenty-four side rods terminating in a respective one of the twenty-four side pockets.

16. The structure of claim 15, wherein the structure is collapsible into a condition wherein the eight first rods, the eight second rods, and the twenty-four side rods run substantially parallel to each other.

17. The structure of claim 15, wherein the structure is collapsible into a condition wherein the first hub abuts the second hub or one of the six side hubs.

\* \* \* \* \*